(12) United States Patent
Minkler et al.

(10) Patent No.: US 11,536,538 B2
(45) Date of Patent: Dec. 27, 2022

(54) TARGET RECOGNITION AND TRACKING FOR A SALVO ENVIRONMENT

(71) Applicant: Raytheon Company, Waltham, MA (US)

(72) Inventors: Jing Q. Minkler, Tucson, AZ (US); Daniel Heacock, Arvada, CO (US)

(73) Assignee: Raytheon Company, Waltham, MA (US)

( * ) Notice: Subject to any disclaimer, the term of this patent is extended or adjusted under 35 U.S.C. 154(b) by 424 days.

(21) Appl. No.: 16/857,820

(22) Filed: Apr. 24, 2020

(65) Prior Publication Data

US 2022/0276340 A1   Sep. 1, 2022

(51) Int. Cl.
| | | |
|---|---|---|
| *F41G 7/22* | (2006.01) | |
| *F41H 11/02* | (2006.01) | |
| *G01S 13/72* | (2006.01) | |
| *G01S 13/00* | (2006.01) | |

(52) U.S. Cl.
CPC ......... *F41G 7/2233* (2013.01); *F41G 7/2253* (2013.01); *F41G 7/2293* (2013.01); *F41H 11/02* (2013.01); *G01S 13/726* (2013.01)

(58) Field of Classification Search
CPC .... F41G 7/2233; F41G 7/2253; F41G 7/2293; F41H 11/02; G01S 13/726
See application file for complete search history.

(56) References Cited

U.S. PATENT DOCUMENTS

| | | | |
|---|---|---|---|
| 4,817,495 A * | 4/1989 | Drobot | F41H 11/02 250/358.1 |
| 5,798,942 A | 8/1998 | Danchick et al. | |
| 6,421,116 B1 | 7/2002 | Schilli et al. | |

(Continued)

FOREIGN PATENT DOCUMENTS

| | | |
|---|---|---|
| CN | 110196001 A | 9/2019 |
| CN | 108168381 B | 10/2019 |

OTHER PUBLICATIONS

"Homeland Missile Defense System Successfully Intercepts ICBM Target", MDA, [Online]. Retrieved from the Internet: <URL: https://www.defense-aerospace.com/articles-view/release/3/201225/two-missile-interceptors-shoot-down-icbm-target-in-test.html>, (Mar. 25, 2019), 2 pgs.

(Continued)

*Primary Examiner* — Bernarr E Gregory
(74) *Attorney, Agent, or Firm* — Schwegman Lundberg & Woessner, P.A.

(57) ABSTRACT

A follow-on object for use in a salvo mission in which one or more lead objects (LO) and a follow-on object track a target. A track state of a tracked object within a sensor field-of-view (FOV) of the follow-on object is initialized. Target-state estimator (TSE) processing based on sensor measurements from the sensor FOV is performed to maintain the track state of the tracked object. Kinematic characteristics of the tracked object are evaluated based on the sensor measurements to compute a probability that the tracked object is an LO based on the evaluated kinematic characteristics. If the probability is not greater than a threshold, the tracked object is designated as the target and TSE processing is resumed. Otherwise, the tracked object is designated as an LO and the track state is re-initialized and the track of the LO is excluded from some intercept task considerations.

20 Claims, 4 Drawing Sheets

(56) References Cited

U.S. PATENT DOCUMENTS

| | | | |
|---|---|---|---|
| 6,704,692 B1 | 3/2004 | Banerjee et al. | |
| 6,877,691 B2* | 4/2005 | DeFlumere | G01S 7/4802 342/52 |
| 7,494,090 B2 | 2/2009 | Leal et al. | |
| 8,083,142 B2 | 12/2011 | Kleder | |
| 8,084,724 B1 | 12/2011 | Brosch et al. | |
| 8,115,148 B1* | 2/2012 | Boardman | F41H 11/02 342/61 |
| 8,378,880 B1* | 2/2013 | Boka | F41H 11/02 342/52 |
| 8,674,276 B2* | 3/2014 | Rovinsky | F41H 11/02 244/3.1 |
| 9,285,190 B1* | 3/2016 | Boardman | F41G 7/2293 |
| 10,386,165 B1 | 8/2019 | Levin et al. | |
| 2019/0196000 A1* | 6/2019 | Bourgoin | G01S 13/726 |

OTHER PUBLICATIONS

Ai, Xiaolin, et al., "Field-of-view constrained two-stage guidance law design for three-dimensional salvo attack of multiple missiles via an optimal control approach", Aerospace Science and Technology 85, (2019), 334-346.

Eshel, Tamir, "Multi-Object Kill Vehicle (MOKV) Begins to Take Shape", Defense-Update, [Online]. Retrieved from the Internet: <URL: https://defense-update.com/20151122_ekv-mokv.html>, (Nov. 22, 2015), 6 pgs.

Niazi, Saeid, et al., "State Estimation for Target Tracking Problems with Nonlinear Kalman Filter Algorithms", International Journal of Computer Applications. vol. 98, No. 17, [Online]. Retrieved from the Internet: <URL: https://www.researchgate.net/publication/286443760_State_Estimation_for_Target_Tracking_Problems_with_Nonlinear_Kalman_Filter_Algorithms>, (Jul. 2014), 30-36.

* cited by examiner

TARGET RECOGNITION AND TRACKING FOR A SALVO ENVIRONMENT

GOVERNMENT RIGHTS

This invention was made with Government support under Contract Number HQ0147-12-C-0004 awarded by the United States Department of Defense. The Government has certain rights in this invention.

TECHNICAL FIELD

Embodiments pertain to target recognition and target tracking in a salvo environment.

BACKGROUND

One issue with target recognition and tracking in a salvo mission is that lead objects may be part of the objects that are acquired and tracked. The use of conventional target state estimator (TSE) tracking in this situation may result in track breaks making it difficult to achieve convergence of the target state. Thus, what is needed are target recognition and tracking techniques that reduce track breaks and provides enhanced tracking capabilities and mission performance in a salvo environment.

SUMMARY

Embodiments of a follow-on object configured for use in a salvo mission in which a plurality of objects, including one or more lead objects (LO) and a follow-on object are configured to track a target are described herein. The track state of a tracked object within a sensor field-of-view (FOV) of the follow-on object is initialized. Target-state estimator (TSE) processing based on sensor measurements from the sensor FOV is performed to maintain the track state of the tracked object. Kinematic characteristics of the tracked object are evaluated based on the sensor measurements to compute a probability that the tracked object is an LO based on the evaluated kinematic characteristics. If the probability is not greater than a threshold, the tracked object is designated as the target and TSE processing is resumed. If the probability is greater than the threshold, tracked object is designated as an LO and the track state is re-initialized based on an observed line-of-sight (LOS) velocity and an estimated range of the LO with respect to the follow-on object to help ensure successful tracking of the LO. When the tracked object is designated as a LO, the track of the LO is excluded from intercept task considerations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein use characteristics of a lead object (LO) to distinguish it from a valid target and eliminate it as a track file of interest. In a salvo scenario, a lead object can be a part of the set of objects that are acquired, tracked and diverted to by a follow-on system. Successful recognition and tracking of lead objects are crucial for mission performance under such conditions. Embodiments disclosed herein use several kinematic properties to characterize a lead object near the start of its track life. Upon recognition of the lead-object, the target state may be re-initialized using an estimated object range and measured object line-of-sight (LOS) velocity. This target state tracking technique may greatly reduce the instances of track breaks and may provide an enhanced tracking capability on lead objects. Other system level decisions can also be modified for the lead objects in order to improve mission performance. These may include the exclusion of lead objects in field-of-view (FOV) containment and divert decisions. These embodiments are described in more detail below.

Figure 1:
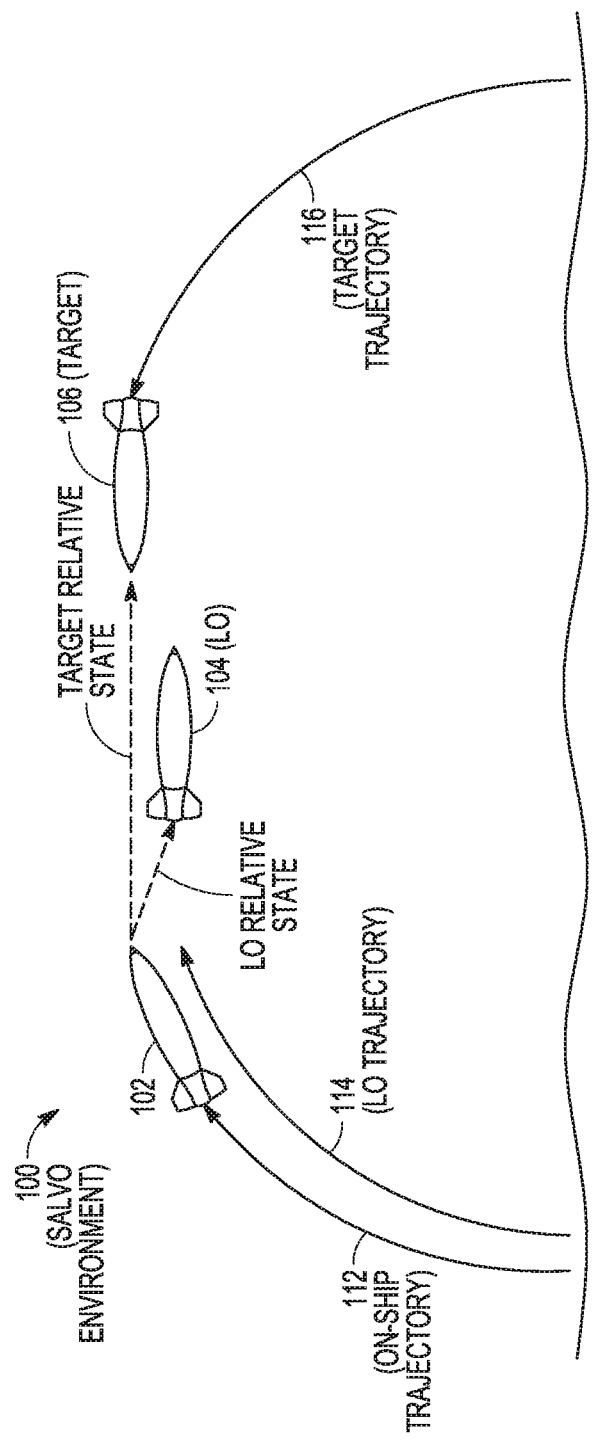
FIG. 1 illustrates a salvo environment in accordance with some embodiments.

FIG. 1 illustrates a salvo environment in accordance with some embodiments. Salvo environment 100 may include a target 106 having target trajectory 116, one or more lead objects (LOs), such as LO 104, each having a LO trajectory, such as LO trajectory 114. Salvo environment 100 may also include one or more follow-on objects, such as follow-on object 102 having trajectory 112.

In salvo environment 100, a salvo shot may comprise a booster-launch of many objects, including one or more LOs and a trailing shot that is launched after the LOs, such as follow-on object 102. In some embodiments, two or more intercept vehicles may be launched back-to-back at a single target. The initial or nominal state of the target track may be provided by a radar tracking station to the objects. As can be seen, the track state of the LOs differs significantly from the track state of the intended target.

Figure 2:
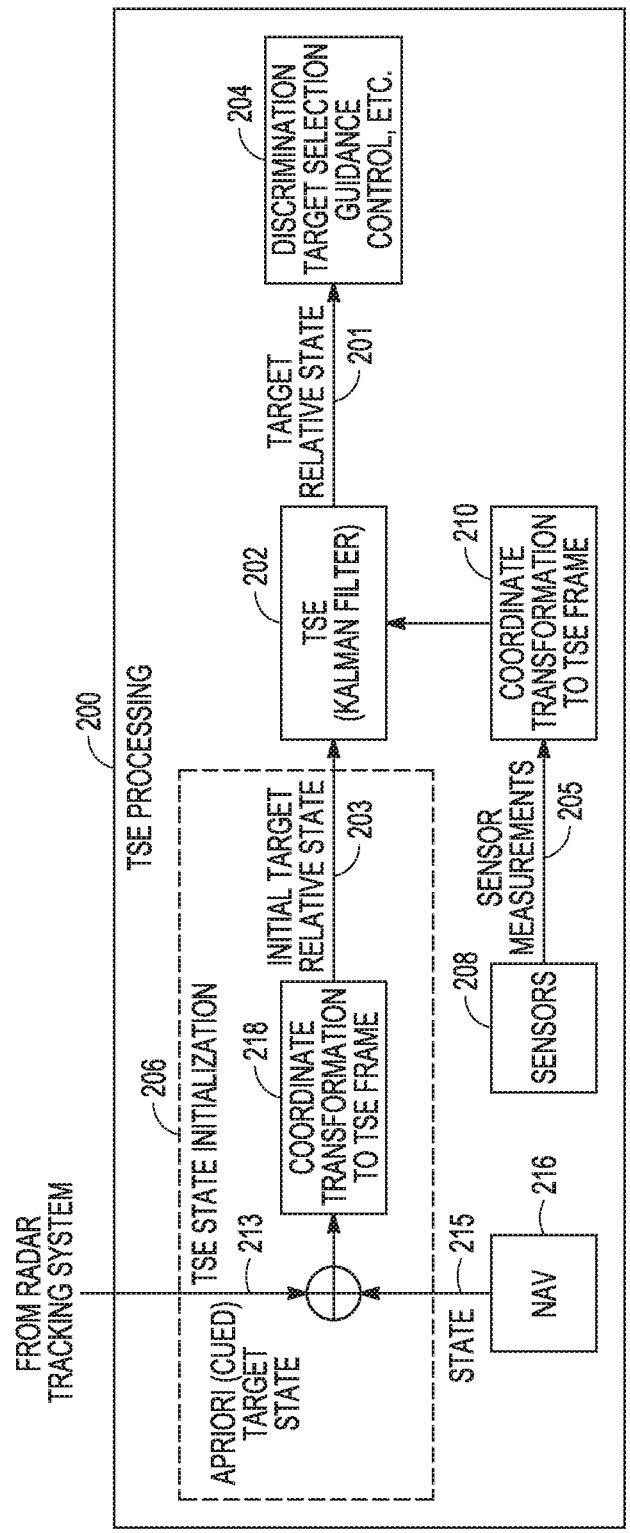
FIG. 2 illustrates a target state estimator (TSE) processing system in accordance with some embodiments.

FIG. 2 illustrates target state estimator (TSE) processing system in accordance with some embodiments. TSE processing system 200 may include one or more processors and is implemented as part of an object, such as in the follow-on object 102 (FIG. 1) and in LO 104 (FIG. 1). TSE processing system 200 is configured to generate a target relative state 201 based on a target state estimator (TSE) 202 for use by processing circuitry 204 of the object for target discrimination, target selection, guidance, control and other mission tasks. In these embodiments, TSE 202 may be a Kalman filter.

As illustrated in FIG. 2, TSE 202 may receive an initial target relative state 203 from TSE state initialization circuitry 206 and may receive sensor measurements 205 from sensors 208 for use in generating the target relative state 201. Coordinate transform element 210 may perform transformation to TSE frame on the sensor measurements 205 prior to use by TSE 202.

As further illustrated in FIG. 2, TSE state initialization circuitry 206 may receive an a-priori (cued) target state 213 from a radar tracking system along with a state 215 from a navigation system (NAV) 216 for use in generating the initial target relative state 203 after coordinate transformation by element 218.

In these embodiments, the TSE initial state 203 may be computed by first subtracting the own-ship state from the nominal (cued) target state with respect to the same reference point in an Earth-based coordinate system. The nominal threat target state may be significantly different from that for a lead object which can cause tracking issues. The target relative state 201 is updated with the onboard sensor measurements using a Kalman filtering process. The target state is used for various tasks such as discrimination, target selection, guidance and control. In these embodiments, lead object identification and tracking capability provide improved mission performance in salvo environment.

Figure 3:
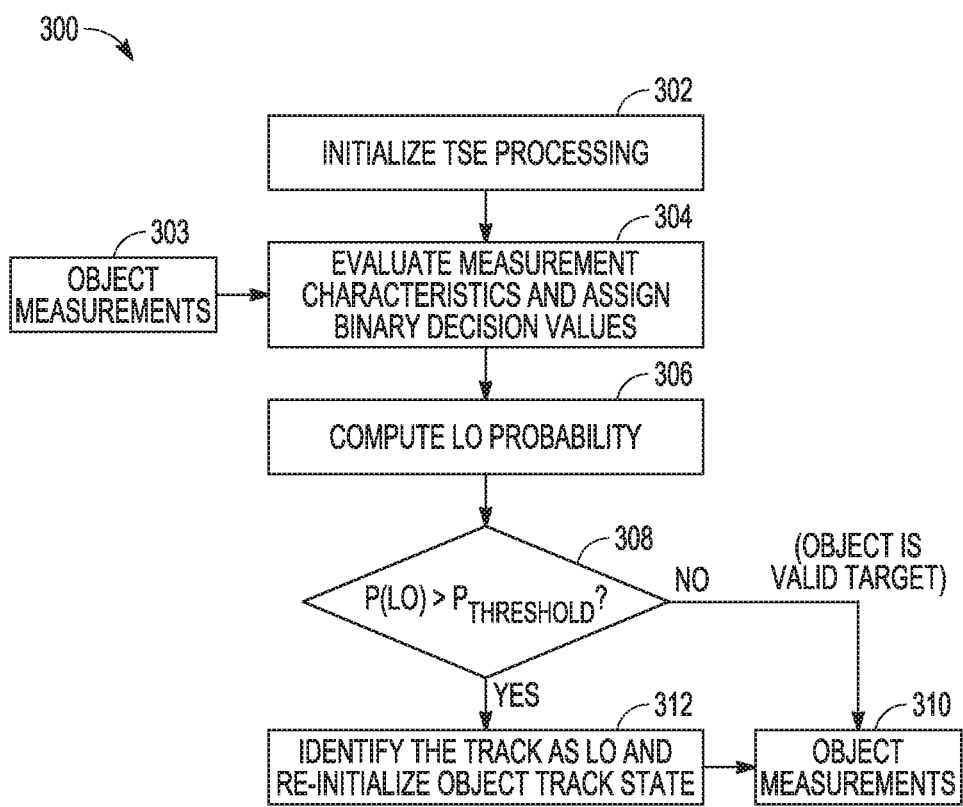
FIG. 3 illustrates a procedure for track-state re-initialization in accordance with some embodiments.

FIG. 3 illustrates a procedure for track-state re-initialization in accordance with some embodiment. Track-state re-initialization procedure 300 may be performed by the one or more processors and processing circuitry of TSE processing system 200. Track-state re-initialization procedure 300 may re-initialize LO tracks using an estimated LO state relative to the own-ship to ensure tracking performance.

In operation 302, TSE processing is initialized for a track state. In these embodiments, a track state is initialized for a tracked object within a sensor field-of-view (FOV) of a follow-on object. Sensor measurements of the tracked object from within the FOV are obtained, and target-state estimator (TSE) processing may be performed based on the sensor measurements to maintain and update the track state of the tracked object.

As illustrated in FIG. 3, operation 304 may comprise evaluating measurement characteristics of object measurements 303. The measurement characteristics may comprise kinematic characteristics of a tracked object based on sensor measurements. The sensor measurements may be acquired from a sensor field-of-view (FOV). In these embodiments, an object may have one or more sensor FOV's, each providing sensor measurements. Sensor measurements may be both infrared (IR) and visible light sensor measurements. In operation 304, decision values, such as binary decision values, may be assigned to each of the measurement characteristics (i.e., $C_1$, $C_2$, ... $C_M$). In some embodiments, the kinematic characteristics comprise at least a position and a velocity. The position may be a position with respect to the intended target. In some embodiments, operation 304 may comprise evaluating how a tracked object is moving and assigning decision values to those movement characteristics.

In operation 306, a probability that the tracked object is an LO is computed based on the evaluated kinematic characteristics. In some embodiments, the processing circuitry may assign binary values and a weight to each of the kinematic characteristics and may compute the probability as a sum of the weighted binary values. In some embodiments, given binary values on M characteristics $C_1$, ..., $C_M$, an LO probability can be computed as a weighted sum:

$$Pr(LO) = w_1 * C_1 + \ldots + w_M * C_M$$

where $w_1$, $w_2$, ..., $w_N$ are weights for each characteristic that may change during different phases of the mission. In some embodiments, the weights are selected to satisfy the equation: $w_1 + w_2 + \ldots + w_M = 1$, so that the weighted sum represents a probability value.

In operation 308, the probability Pr(LO) is compared with a threshold ($P_{threshold}$). If the probability is not greater than the threshold, the tracked object is designated as the threat object (i.e., the target 106 FIG. 1) and in operation 310, TSE processing is resumed (i.e., the track state of the object is continued to be updated) and operations 304-308 may be repeated.

If the probability is greater than the threshold, a LO is recognized and the tracked object is designated as an LO (i.e., LO 104 FIG. 1) and in operation 312 the track state is re-initialized based on a line-of-sight (LOS) velocity and an object range of the LO with respect to the follow-on object. The LOS velocity may be a measured LOS velocity and the object range may be an estimated range, although the scope of the embodiments is not limited in this respect. After the track state of the LO is re-initialized, TSE processing is resumed in operation 310 with the re-initialized track state. Operations 304-308 may be repeated. In these embodiments, the re-initialized track state allows the LO to be successfully tracked. The designation of the LO allows its exclusion from other mission decisions such as FOV containment and divert decisions. The track state is re-initialized based on known time spacing between the shots to ensure tracking performance on the LO object. The track is excluded from the FOV containment, divert and other decisions to improve mission performance.

As discussed above, lead objects have significantly different kinematic characteristics from threat objects. For a specific kinematic characteristic (e.g., position or velocity), the expected statistical distribution for threat objects may be known. In particular, the mean (m) and uncertainty (σ) are available. In some embodiments, based on an object's measurement (for example, velocity), the Mahalanobis (statistical) distance may be used to test if a tracked object is "in" or "out of family" of the threat objects. The Mahalanobis distance may be computed which compares the deviation of the measurements from the expected value (mean) to the expected deviation (σ) (larger values indicate out of family measurements) using the following equation:

$$d = \sqrt{\frac{(v_x - m_x)^2}{\sigma_x^2} + \frac{(v_y - m_y)^2}{\sigma_y^2} + \frac{(v_z - m_z)^2}{\sigma_z^2}}$$

In these embodiments, the binary decision values in operation 304 may be based on whether or not the Mahalanobis distance for a measurement is within an expected deviation, although the scope of the embodiments is not limited in this respect.

Figure 4A:
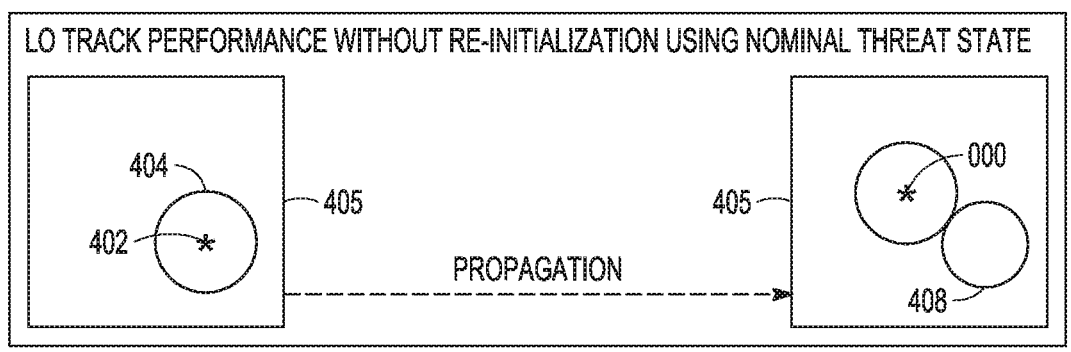
FIG. 4A illustrates lead object (LO) track performance without track-state re-initialization.

FIG. 4A illustrates lead-object (LO) track performance without track-state re-initialization. In FIG. 4A, the track is initialized using the nominal threat state and detection 402 is within the track gate 404 shown in sensor FOV 405. For an LO, after initializing the object track state, detection 406 may be outside the propagated track gate 408 since the LO moves differently (i.e., has different kinematic characteristics) from the threat object. The difference between the LO and the threat object relative positions may cause a significant difference in the object detection movements on the FOV 405. This results in track breaks, as well as poor performance, and may continue for LO detections.

Figure 4B:
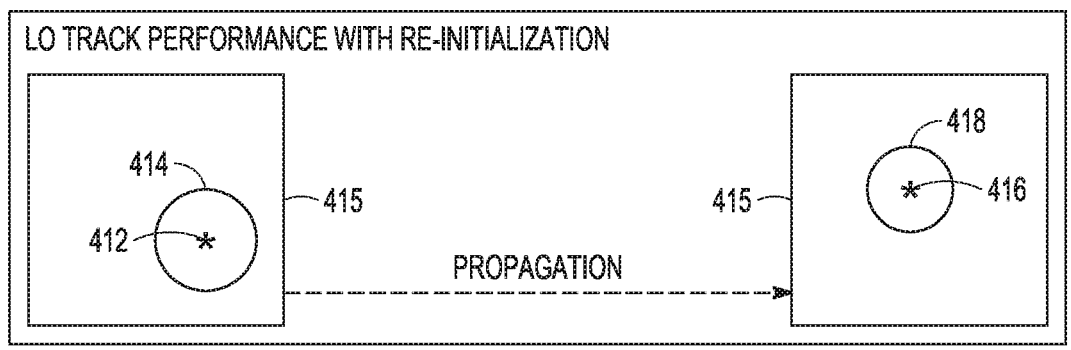
FIG. 4B illustrates LO track performance with track-state re-initialization in accordance with some embodiments.

FIG. 4B illustrates LO track performance with track-state re-initialization in accordance with some embodiments. In FIG. 4B, the track is initialized using the nominal threat state and detection 412 is within the track gate 414 shown in sensor FOV 415. For an LO, detection 416 will be within the propagated track gate 418 when track-state re-initialization is employed. In these embodiments, the track state may be re-initialized using an estimated relative spacing between the LO and the follow-on object (i.e., own ship). Detection 416 is accordingly within the track gate 418 as there is much less velocity error. Accordingly, track breaks may be reduced or eliminated.

Some embodiments are directed an apparatus configured for operation as a follow-on object for use in a salvo mission in which a plurality of objects, including one or more lead objects (LO) and a follow-on object are configured to track a target. In these embodiments, the apparatus may comprise processing circuitry, and memory. In these embodiments, the processing circuitry is configured to initialize a track state of a tracked object, the tracked object within a sensor field-of-view (FOV) of the follow-on object, perform target-state estimator (TSE) processing based on sensor measurements from the sensor FOV to maintain the track state of the tracked object, and evaluate kinematic characteristics of the tracked object based on the sensor measurements to compute a probability that the tracked object is an LO based on the evaluated kinematic characteristics. In these embodiments, if the probability is not greater than a threshold, the tracked object is designated as the target and the TSE processing is resumed. In these embodiments, if the probability is greater than the threshold, the tracked object is designated as an LO and the track state is re-initialized based on an observed line-of-sight (LOS) velocity and an estimated range of the LO with respect to the follow-on object to help ensure successful tracking of the LO. In these embodiments, when the tracked object is designated as a LO, processing circuitry is configured to exclude the track of the LO from some intercept task considerations.

In these embodiments, LO track re-initialization may help mitigate the tracking problems associated with these type of objects (e.g., track breaks and the generation of too many tracks created for the one object). In these embodiments, LO track re-initialization may also help track these kinds of object more successfully. Designating a tracked object as a LO allows the system to exclude the LO from intercept tasks considerations. However, when a tracked object is designated as a LO, it is not excluded from track state update processing. In other words, Kalman filter processing continues to be performed (e.g., taking measurements, updating the track states (pos/vel) and propagate the states).

In some embodiments, if the probability is greater than the threshold and the track state is re-initialized, the processing circuitry is configured to designate a track of the tracked object as an LO track and to exclude the designated LO track from mission decisions including FOV containment decisions and divert decisions.

In some embodiments, the kinematic characteristics comprise at least a position and the LOS velocity, wherein to evaluate the kinematic characteristics, the processing circuitry is configured to assign binary values and a weight to each of the kinematic characteristics. In these embodiments, the processing circuitry is to compute the probability as a sum of the weighted binary values.

In some embodiments, the LOS velocity is a measured LOS velocity with respect to the follow-on object, and the range of the LO is an estimated object range with respect to the follow-on object. In some embodiments, the TSE processing is performed based on the initialized track state and based on the sensor measurements from the sensor FOV to maintain the track state of the tracked object.

In some embodiments, if the probability is greater than the threshold, the processing circuitry is configured to resume the TSE processing with the re-initialized track state. In these embodiments, if the probability is not greater than the threshold, the processing circuitry is configured to resume the TSE processing without re-initializing the track state.

In some embodiments, the sensor measurements of the tracked object comprise visible and/or infrared sensor measurements acquired from within the sensor FOV. In some embodiments, the objects and the follow-on object may be configured to be launched as part of a salvo after a launch of one or more LOs.

In some embodiments, the memory is configured to store at least the track state of the tracked object. Some embodiments are directed to a method performed by processing circuitry of a follow-on object configured for use in a salvo mission in which a plurality of objects, including one or more lead objects (LO) and a follow-on object are configured to track a target. Some embodiments are directed to a non-transitory computer-readable storage medium that stores instructions for execution by processing circuitry of a follow-on object configured for use in a salvo mission in which a plurality of objects, including one or more lead objects (LO) and a follow-on object are configured to track a target.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus configured for operation as a follow-on object for use in a salvo mission in which a plurality of objects, including one or more lead objects (LO) and a follow-on object, are configured to track a target, the apparatus comprising: processing circuitry; and memory, wherein the processing circuitry is configured to:
  initialize a track state of a tracked object, the tracked object within a sensor field-of-view (FOV) of the follow-on object;
  perform target-state estimator (TSE) processing based on sensor measurements from the sensor FOV to maintain the track state of the tracked object;
  evaluate kinematic characteristics of the tracked object based on the sensor measurements to compute a probability that the tracked object is an LO based on the evaluated kinematic characteristics;
  if the probability is not greater than a threshold, designate the tracked object as the target and resume the TSE processing; and
  if the probability is greater than the threshold, designate the tracked object as an LO and re-initialize the track state based on an observed line-of-sight (LOS) velocity and an estimated range of the LO with respect to the follow-on object to help ensure successful tracking of the LO, wherein when the tracked object is designated as a LO, the processing circuitry is configured to exclude the track of the LO from some intercept task considerations.

2. The apparatus of claim 1, wherein if the probability is greater than the threshold and the track state is re-initialized, the processing circuitry is configured to designate a track of the tracked object as an LO track and to exclude the designated LO track from mission decisions including FOV containment decisions and divert decisions.

3. The apparatus of claim 2, wherein the kinematic characteristics comprise at least a position and the LOS velocity, wherein to evaluate the kinematic characteristics, the processing circuitry is configured to assign binary values and a weight to each of the kinematic characteristics, and
wherein the processing circuitry is to compute the probability as a sum of the weighted binary values.

4. The apparatus of claim 3, wherein the LOS velocity is a measured LOS velocity with respect to the follow-on object, and
wherein the range of the LO is an estimated object range with respect to the follow-on object.

5. The apparatus of claim 1, wherein the TSE processing is performed based on the initialized track state and based on the sensor measurements from the sensor FOV to maintain the track state of the tracked object.

6. The apparatus of claim 5, wherein if the probability is greater than the threshold, the processing circuitry is configured to resume the TSE processing with the re-initialized track state, and
wherein if the probability is not greater than the threshold, the processing circuitry is configured to resume the TSE processing without re-initializing the track state.

7. The apparatus of claim 5 further comprising a Kalman filter configured to perform the TSE processing.

8. The apparatus of claim 1, wherein the sensor measurements of the tracked object comprise visible and/or infrared sensor measurements acquired from within the sensor FOV.

9. The apparatus of claim 1, wherein the follow-on object is configured to be launched as part of a salvo after a launch of one or more LOs.

10. The apparatus of claim 1, wherein the memory is configured to store at least the track state of the tracked object.

11. A method performed by processing circuitry of a follow-on object configured for use in a salvo mission in which a plurality of objects, including one or more lead objects (LO) and a follow-on object, are configured to track a target, the method comprising:
initializing a track state of a tracked object, the tracked object within a sensor field-of-view (FOV) of the follow-on object;
performing target-state estimator (TSE) processing based on sensor measurements from the sensor FOV to maintain the track state of the tracked object;
evaluating kinematic characteristics of the tracked object based on the sensor measurements to compute a probability that the tracked object is an LO based on the evaluated kinematic characteristics;
if the probability is not greater than a threshold, designating the tracked object as the target and resume the TSE processing; and
if the probability is greater than the threshold, designating the tracked object as an LO and re-initializing the track state based on an observed line-of-sight (LOS) velocity and an estimated range of the LO with respect to the follow-on object to help ensure successful tracking of the LO,
wherein when the tracked object is designated as a LO, the method comprises excluding the track of the LO from some intercept task considerations.

12. The method of claim 11, wherein if the probability is greater than the threshold and the track state is re-initialized, the method comprises designating a track of the tracked object as an LO track and excluding the designated LO track from mission decisions including FOV containment decisions and divert decisions.

13. The method of claim 12, wherein the kinematic characteristics comprise at least a position and the LOS velocity, wherein to evaluate the kinematic characteristics, the method comprises assigning binary values and a weight to each of the kinematic characteristics, and
wherein the method comprises computing the probability as a sum of the weighted binary values.

14. The method of claim 13, wherein the LOS velocity is a measured LOS velocity with respect to the follow-on object, and
wherein the range of the LO is an estimated object range with respect to the follow-on object.

15. The method of claim 11, wherein the TSE processing is performed based on the initialized track state and based on the sensor measurements from the sensor FOV to maintain the track state of the tracked object.

16. The method of claim 15, wherein if the probability is greater than the threshold, the method comprises resuming the TSE processing with the re-initialized track state, and
wherein if the probability is not greater than the threshold, the method comprises resuming the TSE processing without re-initializing the track state.

17. A non-transitory computer-readable storage medium that stores instructions for execution by processing circuitry of a follow-on object configured for use in a salvo mission in which a plurality of objects, including one or more lead objects (LO) and a follow-on object, are configured to track a target, wherein the instructions configure the processing circuitry to:
initialize a track state of a tracked object, the tracked object within a sensor field-of-view (FOV) of the follow-on object;
perform target-state estimator (TSE) processing based on sensor measurements from the sensor FOV to maintain the track state of the tracked object;
evaluate kinematic characteristics of the tracked object based on the sensor measurements to compute a probability that the tracked object is an LO based on the evaluated kinematic characteristics;
if the probability is not greater than a threshold, designate the tracked object as the target and resume the TSE processing; and
if the probability is greater than the threshold, designate the tracked object as an LO and re-initialize the track state based on an observed line-of-sight (LOS) velocity and an estimated range of the LO with respect to the follow-on object to help ensure successful tracking of the LO,
wherein when the tracked object is designated as a LO, the processing circuitry is configured to exclude the track of the LO from some intercept task considerations.

18. The non-transitory computer-readable storage medium of claim 17, wherein if the probability is greater than the threshold and the track state is re-initialized, the processing circuitry is configured to designate a track of the tracked object as an LO track and excluded the designated LO track from mission decisions including FOV containment decisions and divert decisions.

19. The non-transitory computer-readable storage medium of claim 18, wherein the kinematic characteristics comprise at least a position and the LOS velocity, wherein to evaluate the kinematic characteristics, the processing circuitry is configured to assign binary values and a weight to each of the kinematic characteristics, and wherein the processing circuitry is to compute the probability as a sum of the weighted binary values.

20. The non-transitory computer-readable storage medium of claim 17, wherein the TSE processing is performed based on the initialized track state and based on the sensor measurements from the sensor FOV to maintain the track state of the tracked object, wherein if the probability is greater than the threshold, the processing circuitry is configured to resume the TSE processing with the re-initialized track state, and wherein if the probability is not greater than the threshold, the processing circuitry is configured to resume the TSE processing without re-initializing the track state.

* * * * *

UNITED STATES PATENT AND TRADEMARK OFFICE
CERTIFICATE OF CORRECTION

| | |
|---|---|
| PATENT NO. | : 11,536,538 B2 |
| APPLICATION NO. | : 16/857820 |
| DATED | : December 27, 2022 |
| INVENTOR(S) | : Minkler et al. |

It is certified that error appears in the above-identified patent and that said Letters Patent is hereby corrected as shown below:

In the Drawings

Sheet 4 of 4, Fig. 4A, reference numeral 000, Line 1, delete "000" and insert --406-- therefor In the Specification In Column 2, Line 51, delete "circuity" and insert --circuitry-- therefor In Column 3, Line 56, delete "$w_N$" and insert --$w_M$-- therefor In Column 4, Line 28, delete ""out of family"" and insert --"out of" family-- therefor Signed and Sealed this
Twenty-first Day of May, 2024

*Katherine Kelly Vidal*
Katherine Kelly Vidal
*Director of the United States Patent and Trademark Office*